US006968696B2

(12) United States Patent
Little

(10) Patent No.: US 6,968,696 B2
(45) Date of Patent: Nov. 29, 2005

(54) PART LOAD BLADE TIP CLEARANCE CONTROL

(75) Inventor: David Allen Little, Chuluota, FL (US)

(73) Assignee: Siemens Westinghouse Power Corporation, Orlando, FL (US)

( * ) Notice: Subject to any disclaimer, the term of this patent is extended or adjusted under 35 U.S.C. 154(b) by 125 days.

(21) Appl. No.: 10/654,747

(22) Filed: Sep. 4, 2003

(65) Prior Publication Data

US 2005/0050901 A1 Mar. 10, 2005

(51) Int. Cl.⁷ .................................................. F02C 7/12
(52) U.S. Cl. ............................. 60/772; 60/782; 60/806
(58) Field of Search ........................ 60/772, 782, 806, 60/805; 415/115, 116

(56) References Cited

U.S. PATENT DOCUMENTS

| 4,127,988 | A |   | 12/1978 | Becker |          |
|-----------|---|---|---------|--------|----------|
| 4,503,683 | A |   |  3/1985 | Wieland et al. |  |
| 5,163,285 | A |   | 11/1992 | Mazeaud et al. |  |
| 5,317,877 | A |   |  6/1994 | Stuart |          |
| 5,575,617 | A |   | 11/1996 | Marmilic et al. | |
| 5,619,855 | A | * |  4/1997 | Burrus | ........................ 60/736 |
| 5,678,408 | A |   | 10/1997 | Janes |           |
| 6,067,792 | A | * |  5/2000 | Tubbs | .......... 60/806 |
| 6,250,061 | B1|   |  6/2001 | Orlando |         |
| 6,295,803 | B1|   | 10/2001 | Bancalari |       |
| 6,351,938 | B1|   |  3/2002 | Kerrebrock |      |
| 6,367,242 | B1| * |  4/2002 | Uematsu et al. | ......... 60/39.182 |
| 6,382,903 | B1|   |  5/2002 | Caruso et al. |   |
| 6,401,460 | B1|   |  6/2002 | Xia |             |
| 6,532,744 | B1| * |  3/2003 | Reiter et al. | ................... 60/782 |
| 6,584,778 | B1| * |  7/2003 | Griffiths et al. | ............... 60/782 |
| 6,644,035 | B1| * | 11/2003 | Yamanaka et al. | ............ 60/806 |
| 6,672,072 | B1| * |  1/2004 | Giffin, III | ..................... 60/782 |

FOREIGN PATENT DOCUMENTS

| EP | 0735255 A1 | 10/1996 |
| EP | 1074694 A2 | 2/2001 |
| JP | 2000291447 A2 | 10/2000 |
| JP | 2000310127 A2 | 11/2000 |
| JP | 2001065367 A2 | 3/2001 |

* cited by examiner

Primary Examiner—Ehud Gartenberg

(57) ABSTRACT

Aspects of the invention relate to a turbine engine configuration and method for overcoming a turbine blade tip clearance problem that can arise when the turbine inlet temperature is maintained at a high level during part load operation of the turbine. Aspects of the invention relate to reducing rotor cooling air to a temperature below the design temperature level by using, for example, additional heat extraction devices or by reconfiguring or resizing existing heat exchanger devices. Upon exposure to the cooled air, the discs and blades of the turbine will shrink so as to provide a clearance between the blade tips and surrounding stationary support structure. The design rotor cooling air temperature can be from about 350 degrees Fahrenheit to about 480 degrees Fahrenheit. Aspects of the present invention can be used to decrease the rotor cooling air to about 150 degrees Fahrenheit at about 70 percent load.

16 Claims, 4 Drawing Sheets

PART LOAD BLADE TIP CLEARANCE CONTROL

FIELD OF THE INVENTION

The invention relates in general to turbine engines and, more particularly, to an apparatus and method for maintaining a minimum clearance between turbine blade tips and the surrounding turbine support structure under part load conditions.

BACKGROUND OF THE INVENTION

Turbine engines, such as single shaft industrial gas turbines, are designed to operate at a constant design turbine inlet temperature under any ambient air temperature (i.e., the compressor inlet temperature). This design turbine inlet temperature allows the engine to produce maximum possible power, known as base load. Any reduction from the maximum possible base load power is referred to as part load operation. In other words, part load entails all engine operation from 0% to 99.9% of base load power.

Part load operation may result in the production of high levels of carbon monoxide (CO) during combustion. One known method for reducing part load CO emissions is to bring the combustor exit temperature or the turbine inlet temperature near that of the base load design temperature. It should be noted that, for purposes of this disclosure, the terms combustor exit temperature and turbine inlet temperature are used interchangeably. In actuality, there can be from about 30 to about 80 degrees Fahrenheit difference between these two temperatures due to, among other things, cooling and leakage effects occurring at the transition/turbine junction. However, with respect to aspects of the present invention, this temperature difference is insubstantial.

To bring the combustor exit temperature closer to the base load design temperature, mass flow of air through a turbine engine 10 (FIG. 1) can be restricted by closing the compressor inlet guide vanes (IGV) (not shown), which act as a throttle at the inlet of the compressor 12. When the IGVs are closed, the trailing edges of the vanes rotate closer to the surface of an adjacent vane, thereby effectively reducing the available throat area. Reducing throat area reduces the flow of air which the first row of rotating blades can draw into the compressor 12. Lower flow to the compressor 12 leads to a lower compressor pressure ratio being established by the turbine section 11 of the engine 10. Consequently, the compressor exit temperature decreases because the compressor 12 does not input as much energy into the incoming air.

Some of the compressor exit air 14 from the combustor shell 15 is used to cool the stationary support structure 16 of the turbine near the first row of blades 20a. The stationary support structure 16 can include the outer casing, blade rings, and ring segments. In addition, some compressed air is piped directly out of the compressor 12 through piping 19a (additional pipes not shown). This compressor bleed air is used to cool the stationary support structure 16 near the second, third and fourth rows of blades 20b,20c,20d and is supplied through piping 19b,19c,19d. Because of the decrease in compressor exit and bleed air temperature due to the closed IGV position, the support structure 16 will contract, that is, it will shrink in radius when exposed to the cooler compressor exit and bleed air. But, at the same time, the temperature of the hot gas leaving the combustor 18 and flowing over the turbine blades 20a,20b,20c,20d (hereafter collectively referred to as "20") is kept at a high level, causing a constant radially outward thermal expansion of the blades 20.

The expansion of the blades 20 along with the shrinkage of the support structure 16 reduces the clearance C between the tips 21 of the blades 20 and the surrounding support structure 16, commonly referred to as the blade tip clearance C. While the clearance C is shown between the fourth row of blades 20d and the adjacent support structure 16, similar clearances C exist between the first, second and third rows of blades 20a,20b,20c and the stationary support structure 16. It is critical to maintain a minimal blade tip clearance C sufficient enough that the blades 20 do not rub against the support structure 16; however, this constraint limits the load reduction which can be achieved with the combustor exit temperature kept near that of base load temperature.

SUMMARY OF THE INVENTION

Thus, one object according to aspects of the present invention is to provide a method for overcoming a blade tip clearance problem that can occur when the turbine inlet temperature is maintained at a high level during part load operation of a gas turbine. Another object according to aspects of the present invention is to provide a turbine engine configured to maintain a sufficient blade tip clearance under certain part load conditions. These and other objects according to aspects of the present invention are addressed below.

In one respect, aspects of the present invention are directed to a method for maintaining blade tip clearances under part load turbine operation. The method is applied to a turbine engine operating under part load. The engine has a rotor with discs on which a plurality of turbine blades are attached. The method includes supplying cooling air to the rotor and discs at a substantially constant design rotor cooling temperature, and reducing the temperature of the cooling air supplied to the rotor and discs to a temperature below the design rotor cooling temperature. Exposure to the reduced temperature rotor cooling air causes the rotor and discs to shrink.

The substantially constant design cooling temperature can be from about 350 degrees Fahrenheit to about 480 degrees Fahrenheit. The temperature of the rotor cooling air can be reduced to less than about 350 degrees Fahrenheit, or, in one case, the temperature of the cooling air can be reduced to about 150 degrees Fahrenheit at about 70 percent load.

The turbine engine can include a compressor section having an inlet and an outlet. A plurality of inlet guide vanes can be movably positioned at the compressor inlet. Thus, the method can further include the step of moving the inlet guide vanes to a closed position so as to reduce the mass flow of air through the turbine engine; consequently, the combustor exit temperature increases and the compressor exit temperature decreases.

Other aspects according to the present invention relate to a turbine engine assembly. The assembly includes a turbine engine, operating under part load, having a compressor section, a combustor section and a turbine section. The compressor section has an inlet and an exit. The turbine section includes a rotor with discs on which a plurality of turbine blades are attached. The engine is configured so as to supply cooling air to the rotor and discs at a substantially constant design temperature. The turbine engine can be a part of a simple cycle system or part of a combined cycle system.

The assembly further includes a cooling circuit configured to reduce the rotor cooling air temperature to a temperature below the design temperature before the cooling air is supplied to the rotor and disc. In one configuration, the cooling circuit can include an intermediate pressure kettle boiler, a low pressure kettle boiler and a heat exchanger connected in series. The heat exchanger can use economizer water as the sink. Alternatively, the heat exchanger can use condenser water as the sink. A circuit can be provided for at least partially bypassing the heat exchanger. In another configuration, the cooling circuit can include at least one heat exchanger, which can be a fin-fan cooler.

The substantially constant design temperature of the cooling air can be from about 350 degrees Fahrenheit to about 480 degrees Fahrenheit. Thus, the cooling circuit can reduce the temperature of the cooling air to below about 350 degrees Fahrenheit. In one embodiment, the cooling circuit reduces the rotor cooling temperature to about 150 degrees Fahrenheit when the engine is at about 70% load.

DETAILED DESCRIPTION OF EMBODIMENTS OF THE INVENTION

Aspects of the present invention address a blade tip clearance problem that can occur when the turbine inlet temperature is maintained at a high level during part load operation of a gas turbine, which may be done, for example, to reduce CO emissions. To that end, aspects of the present invention relate to a method for ensuring a minimum blade tip clearance under such conditions. Other aspects of the present invention relate to a turbine engine configuration for maintaining a blade tip clearance during part load operation.

Figure 1:
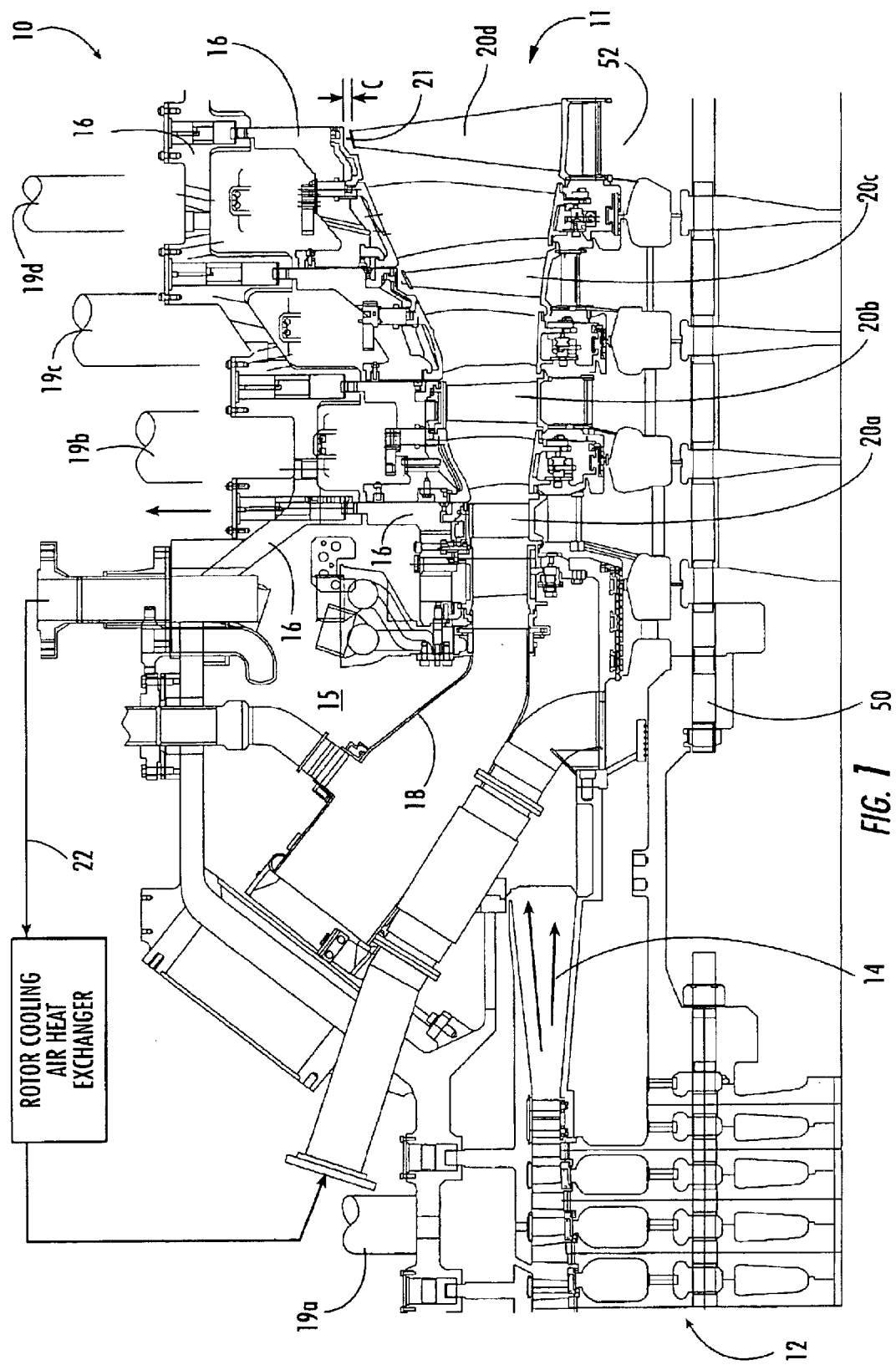
FIG. 1 is a cross-sectional view of a turbine engine.
Figure 2:
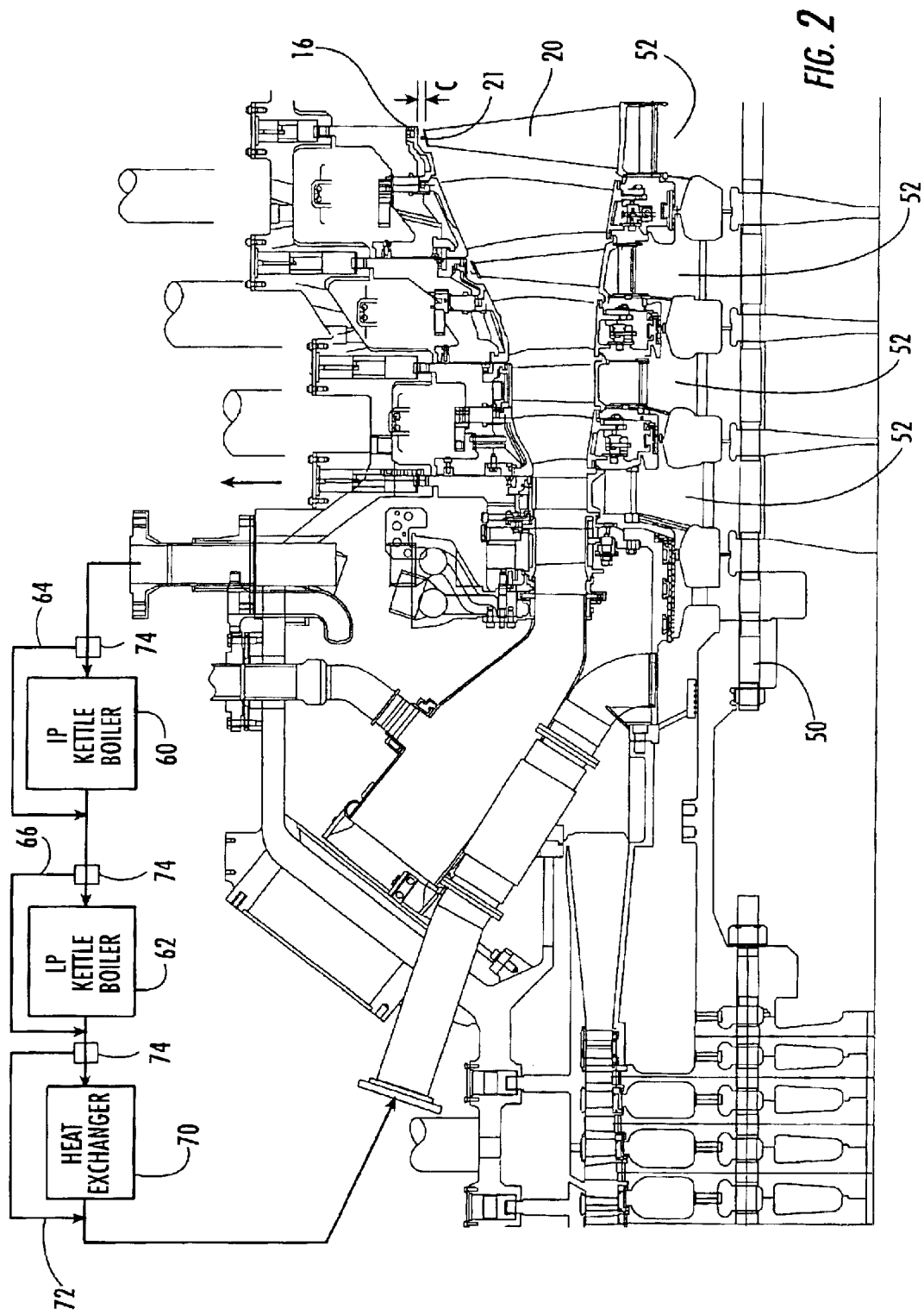
FIG. 2 is a cross-sectional view, partly schematic, of a turbine engine, showing one example of a rotor cooling air circuit according to aspects of the present invention.
Figure 3:
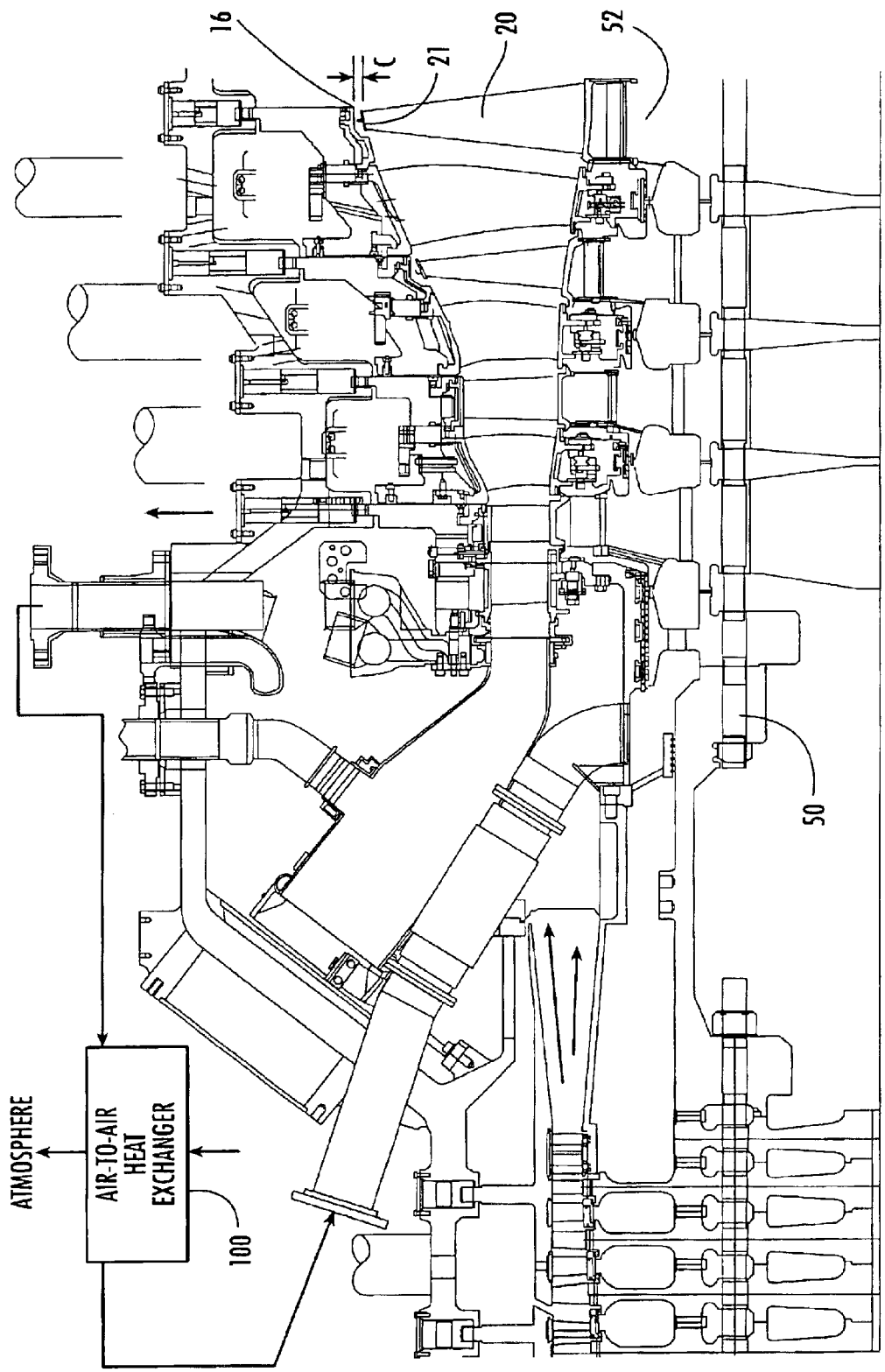
FIG. 3 is a cross-sectional view, partly schematic, of a turbine engine, showing another example of a rotor cooling air circuit according to aspects of the present invention.
Figure 4:
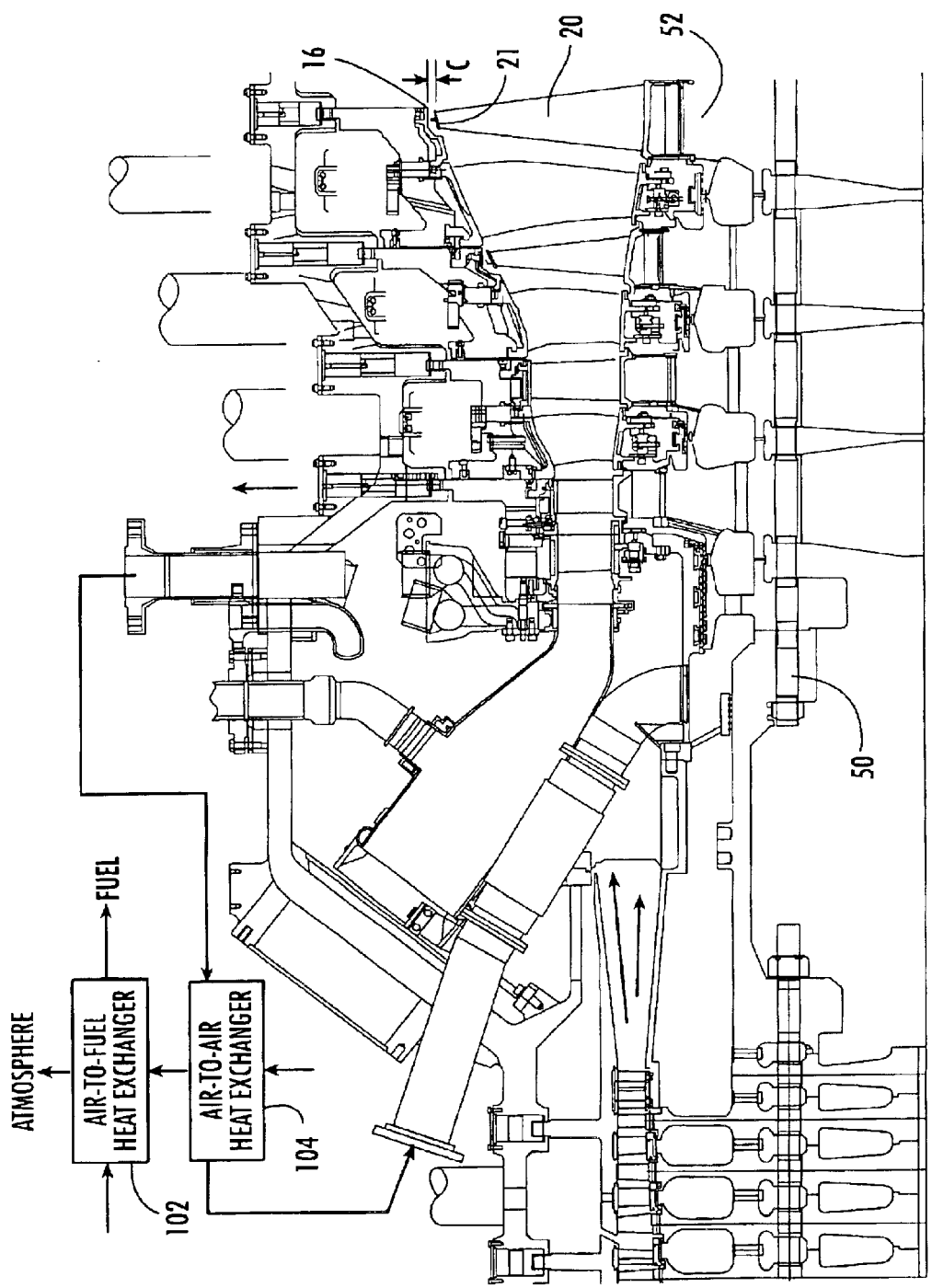
FIG. 4 is a cross-sectional view, partly schematic, of a turbine engine, showing a further example of a rotor cooling air circuit according to aspects of the present invention.

Embodiments according to aspects of the invention are shown in FIGS. 2–4, but the present invention is not limited to the illustrated structure or application. Further, the following detailed description is intended only as exemplary.

In some turbine engine designs, compressor exit air 14 from the combustor shell 15 can be used to cool at least the turbine rotor 50, discs 52, and blades 20. In such instances, the compressor exit air is routed out of the engine, passed through a cooling circuit 22, and is ultimately redelivered to the engine at a substantially constant design cooling air return temperature. The design temperature is held substantially constant so that the discs 52 and blades 20 metal temperatures are held substantially constant, thereby maintaining the life of the discs 52 and blades 20.

The design cooling return temperature can be specific to a particular engine design. For instance, in the Siemens Westinghouse W501G engine, the design cooling air return temperature is about 350 degrees Fahrenheit for loads below 90%. When load reaches 90%, the temperature of the rotor cooling air can be increased to about 405 degrees Fahrenheit to about 480 degrees Fahrenheit. The rotor cooling temperature is increased at loads of 90% and above as an active means for reducing tip clearances C at full load to maximize engine power and efficiency. For when rotor cooling air return temperature increases, the discs 52 and blades 20 expand radially outward, causing the clearance C between the tips 21 of the blades 20 and the nearby stationary support structure 16 to decrease. The smaller clearance C mean less losses and, thus, more power extraction for the same fuel input, thereby increasing efficiency. Further, rotor cooling air return temperature can be increased above 90% load because, by the time the engine reaches that level, most of the stationary components 16 of the engine have thermally grown to their final shapes. Thus, distortion and ovalization, which can cause blade tip rubbing, are minimized.

Again, the Siemens Westinghouse W501G is only one example of a design cooling air return temperature. In other engines, the design cooling air return temperature can range from about 350 degrees Fahrenheit to about 480 degrees Fahrenheit.

Whatever the specification, the design cooling air return temperature can be supplied at a substantially constant temperature so that the rotor 50 and the discs 52 are always at substantially constant metal temperatures. However, the temperature of the compressor exit air 14 often exceeds the design cooling air return temperature. Therefore, to provide cooling air at the design temperature, the required quantity of compressor exit 14 air is bled from the combustor shell 15 and cooled to the appropriate temperature in an external cooling system 22, which is configured to reduce the cooling air to the design cooling air return temperature. The external cooling system can include heat exchanger devices as well as valves for controlling the quantity of air passing through or bypassing the heat exchanger devices so as to achieve the design cooling air return temperature. Once treated, the cooled air can be returned to the engine to cool at least the rotor 50 and discs 52 at the substantially constant design cooling air return temperature.

Aspects of the invention relate to an apparatus and method for ensuring adequate blade tip clearance C under part load conditions. Aspects of the invention relate to reducing the cooling air return temperature to below the design temperature level to maintain a minimum acceptable clearance C between a blade tip 21 and surrounding stationary support structure 16. The minimum acceptable clearance C can be about 1 millimeter or about 0.040 inches. Because the temperature of the cooling return air is lower than the design temperature, the discs 52 and blades 20 will tend to shrink when exposed to the cooling return air. In spite of the expansion of the turbine blades 20 due to the passing high temperature gases as well as the shrinkage of the stationary support structure 16 due to cooler compressor exit air 14 and compressor bleed air temperatures, as described earlier, an adequate blade tip clearance C will nonetheless be maintained because the cooler temperature of the cooling air return causes the discs 52 and blades 20 to shrink, widening the gap between the tip 21 of the blade 20 and the nearby support structure 16 at part load.

The extent to which the temperature of the cooling air return is dropped can vary greatly. For instance, once load drops below 70%, the rotor cooling air return temperature can be ramped down to, for example, approximately 150 degrees Fahrenheit. In the above example, the 70% load accompanying the required cooling air return temperature is merely a way of relating internal conditions to readily available engine information. Any reduction below the design cooling air temperature can occur at almost any percentage load.

There is not necessarily any engine based lower temperature limit to which the cooling air return can be dropped. The limit would depend on various features of the heat extraction device such as the sink temperature. The amount by which the cooling air will need to be reduced can be a function of at least the compressor inlet temperature, IGV position (and thus pressure ratio and compressor delivery temperature), percentage load, and turbine inlet temperature in part load operation.

To accomplish this objective, the heat exchangers currently extracting heat from the rotor cooling air can be increased in size and/or reconfigured, depending upon the particular engine cycle. Alternatively, additional heat extraction devices can be employed in addition to those currently used.

For example, in combined cycle systems such as the Siemens Westinghouse W501G installation, air from the combustor shell 15 is passed in series through an intermediate pressure (IP) kettle boiler 60 and then low pressure (LP) kettle boiler 62 such that heat from the air is used to generate IP steam and LP steam, as shown in FIG. 2. Bypass circuits 64,66 can be associated with each boiler 60,62 to allow for regulation of cooling air return temperature.

Applying aspects of the present invention to such a configuration can require a lower temperature sink to further decrease the cooling air return temperature below the design temperature. Thus, an additional heat exchanger 70 can be added in series with the steam kettle boilers 60,62. The heat exchanger 70 can use economizer supply water as the sink. Alternatively, the heat exchanger 70 can use condenser water as the sink. In these configurations, the temperature of the cooling air can be reduced to about 30 degrees Fahrenheit above the temperature of the sink. A bypass circuit 72 can be associated with the additional heat exchanger 70. Further, valves 74 can control the quantity of air passing through or bypassing the kettle boilers 60,62 and/or heat exchanger 70 so as to achieve the desired cooling air return temperature.

In contrast to combined cycle systems, there is no steam available in simple cycle systems. Thus, such systems generally employ different heat exchanger devices to achieve the design cooling air return temperature. For example, in the simple cycle configuration of the Siemens Westinghouse W501FD engine, the rotor 50 and discs 52 can be cooled in one of two ways. In a first configuration, shown in FIG. 3, an air-to-air heat exchanger 100, such as a fin-fan cooler, can be used to extract heat from the rotor cooling air return with the heat being dumped into the atmosphere. In a second configuration, shown in FIG. 4, an air-to-fuel gas heat exchanger 102 can be used in combination with an air-to-air heat exchanger 104 for greater efficiency. Heat can first be extracted from the rotor cooling air by the air-to-air heat exchanger 104, and the rejected heat can be blown over a fuel heater 102, providing for recovery of a portion of the heat.

Aspects of the present invention can be applied to these simple cycle configurations. For example, as to the first configuration, the capacity of the heat exchanger 100 can be increased to allow rotor cooling air to be cooled to near ambient temperature. With respect to the second configuration, the air-to-air heat exchanger 104 can be increased in size or reconfigured so as to cover the instances in which fuel heating is not required, yet low rotor cooling air temperatures for tip clearance control is required.

It will of course be understood that the invention is not limited to the specific details described herein, which are given by way of example only, and that various modifications and alterations are possible within the scope of the invention as defined in the following claims.

What is claimed is:

1. A method for maintaining blade tip clearances under part load turbine operation comprising the steps of:

operating a turbine engine under part load, the engine having a rotor with discs on which a plurality of turbine blades are attached;

supplying cool air to the rotor and discs at a design cooling-temperature for a design-load operation; and reducing the temperature of the cooling air supplied to the rotor and discs to a temperature below said rotor design-load cooling-temperature, wherein exposure to the reduced temperature cooling air causes the rotor and discs to shrink; and wherein the cooling air exchanges heat with water of either one of an economizer or a condenser.

2. The method of claim 1 wherein the substantially constant design cooling temperature is from about 350 degrees Fahrenheit to about 480 degrees Fahrenheit.

3. The method of claim 1 wherein the turbine engine includes a compressor section having an inlet and an outlet, a plurality of inlet guide vanes being movably positioned at the compressor inlet.

4. The method of claim 3 further including the step of:

moving the inlet guide vanes to a closed position so as to reduce the mass flow of air through the turbine engine, whereby the combustor exit temperature increases and the compressor exit temperature decreases.

5. The method of claim 1 wherein the temperature of the cooling air is reduced to about 150 degrees Fahrenheit at about 70 percent load.

6. The method of claim 1 wherein the temperature of the cooling air is reduced to less than about 350 degrees Fahrenheit.

7. A turbine engine assembly comprising:

a turbine engine having a compressor section, a combustor section and a turbine section, the turbine section including a rotor with discs on which a plurality of turbine blades are attached, the engine configured so as to supply cooling air to the rotor and discs at a design temperature when the turbine engine operates at design load;

a cooling circuit configured to reduce the cooling air temperature to a temperature below the design-load cooling temperature when the engine is operating under part load condition; and wherein a heat exchanger of said cooling circuit uses water of either an economizer or a condenser as a heat sink.

8. The assembly of claim 7 wherein the cooling circuit includes an intermediate pressure kettle boiler, a low pressure kettle boiler and said heat exchanger connected in series.

9. The assembly of claim 8 further including a circuit for at least partially bypassing the heat exchanger.

10. The assembly of claim 7 wherein the cooling circuit reduces the temperature cooling air to below about 350 degrees Fahrenheit.

11. The assembly of claim 7 wherein the cooling circuit includes at least one heat exchanger.

12. The assembly of claim 11 wherein the at least one heat exchanger is a fin-fan cooler.

13. The assembly of claim 7 wherein the turbine engine is part of a simple cycle system.

14. The assembly of claim 7 wherein the turbine engine is part of a combined cycle system.

15. The assembly of claim 7 wherein the cooling circuit reduces the rotor cooling temperature to about 150 degrees Fahrenheit when the engine is at about 70% load.

16. The assembly of claim 7 wherein the substantially constant design cooling temperature is from about 350 degrees Fahrenheit to about 480 degrees Fahrenheit.

* * * * *